United States Patent
Cattoni

(10) Patent No.: US 10,708,142 B2
(45) Date of Patent: Jul. 7, 2020

(54) METHODS, SYSTEMS, AND COMPUTER READABLE MEDIA FOR PROVIDING CLOUD VISIBILITY

(71) Applicant: Keysight Technologies, Inc., Minneapolis, MN (US)

(72) Inventor: Andrea Fabio Cattoni, Nibe (DK)

(73) Assignee: Keysight Technologies, Inc., Santa Rosa, CA (US)

( * ) Notice: Subject to any disclaimer, the term of this patent is extended or adjusted under 35 U.S.C. 154(b) by 180 days.

(21) Appl. No.: 15/879,405

(22) Filed: Jan. 24, 2018

(65) Prior Publication Data

US 2019/0229998 A1    Jul. 25, 2019

(51) Int. Cl.
*H04L 12/24* (2006.01)
*H04L 29/06* (2006.01)
*H04L 29/08* (2006.01)

(52) U.S. Cl.
CPC ............ *H04L 41/14* (2013.01); *H04L 63/145* (2013.01); *H04L 63/1416* (2013.01); *H04L 67/10* (2013.01); *H04L 67/30* (2013.01)

(58) Field of Classification Search
CPC ....... G06F 11/34–3466; H04L 41/5038; H04L 43/50
See application file for complete search history.

(56) References Cited

U.S. PATENT DOCUMENTS

| | | | |
|---|---|---|---|
| 6,597,907 B1 * | 7/2003 | Pruitt | H04L 41/0681 455/423 |
| 6,996,728 B2 | 2/2006 | Singh | |
| 7,979,729 B2 | 7/2011 | Bletsch et al. | |
| 8,756,441 B1 | 6/2014 | Mullins et al. | |
| 9,069,890 B2 * | 6/2015 | Kaiser | G06F 11/3442 |
| 9,147,086 B1 * | 9/2015 | Potlapally | G06F 21/64 |
| 9,170,916 B2 | 10/2015 | Dalton et al. | |
| 9,547,027 B2 | 1/2017 | Varma et al. | |
| 9,672,355 B2 | 6/2017 | Titonis et al. | |

(Continued)

OTHER PUBLICATIONS

Makris, "Measuring and Analyzing Energy Consumption of the Data Center," Thesis, School of Electrical Engineering, Aalto University, pp. 1-39 (Jul. 15, 2017).

(Continued)

*Primary Examiner* — David R Lazaro

(57) ABSTRACT

Methods, systems, and computer readable media for providing cloud visibility are disclosed. According to one method, the method includes obtaining at least one correlation profile for indicating effects of workload configurations on hardware and/or software measurements of a reference server, wherein the reference server includes components for measuring hardware and/or software performance. The method also includes configuring the reference server, wherein the reference server is one of a plurality of servers in a cloud-based environment for executing a workload, wherein each of the plurality of servers executes at least a portion of the workload. The method further includes receiving, from the reference server, measurements associated with executing at least the portion of the workload. The method also includes generating information regarding the cloud-based environment using the measurements from the reference server and the at least one correlation profile.

20 Claims, 5 Drawing Sheets

(56) References Cited

U.S. PATENT DOCUMENTS

| | | | |
|---|---|---|---|
| 10,067,523 B2* | 9/2018 | El-Essawy | H05K 7/1492 |
| 2007/0177446 A1* | 8/2007 | Roth | G06F 11/3688 |
| | | | 365/230.03 |
| 2009/0007108 A1 | 1/2009 | Hanebutte | |
| 2011/0022870 A1 | 1/2011 | McGrane et al. | |
| 2011/0072293 A1 | 3/2011 | Mazzaferri et al. | |
| 2011/0213997 A1 | 9/2011 | Kansal et al. | |
| 2014/0047272 A1* | 2/2014 | Breternitz | G06F 11/3495 |
| | | | 714/32 |
| 2014/0288861 A1 | 9/2014 | Gross et al. | |
| 2014/0359310 A1 | 12/2014 | Haridass et al. | |
| 2015/0355247 A1 | 12/2015 | Choe et al. | |
| 2016/0274636 A1 | 9/2016 | Kim | |
| 2017/0078159 A1* | 3/2017 | Bae | H04L 41/5038 |
| 2017/0286209 A1* | 10/2017 | Heroor | G06F 11/0793 |
| 2019/0229998 A1* | 7/2019 | Cattoni | H04L 41/14 |

OTHER PUBLICATIONS

Economou et al., "Full-System Power Analysis and Modeling for Server Environments," Department of Electrical Engineering, Stanford University, pp. 1-8 (2006).

Eidson, "IEEE-1588 Standard for a Precision Clock Synchronization Protocol for Networked Measurement and Control Systems—A Tutorial," Agilent Technologies, pp. 1-94 (Oct. 2005).

* cited by examiner

METHODS, SYSTEMS, AND COMPUTER READABLE MEDIA FOR PROVIDING CLOUD VISIBILITY

TECHNICAL FIELD

The subject matter described herein relates to network communications. More specifically, the subject matter relates to methods, systems, and computer readable media for providing cloud visibility.

BACKGROUND

Cloud-based environments typically involve compute, storage, and network resources located in one or more locations (e.g., data centers). For example, a cloud service provider may provide access to a pool of compute, storage, and network resources for one or more tenants (e.g., customers). In this example, each tenant may use these resources in a networked or distributed computing system, also referred to as a cloud, to execute workloads and perform or provide various services and/or functions.

Cloud visibility systems attempt to provide visibility into various aspects of cloud-based environments. For example, a cloud visibility system may attempt to provide insight into the behavior of a cloud's infrastructure, including power usage, workload efficiency, machine efficiency, and related security. However, issues arise when such systems attempt to provide deeper insight into cloud-based environments because of the myriad of heterogeneous software layers, multiple component and network configurations, and a general lack of centralized, granular (e.g., lower level) monitoring tools.

SUMMARY

Methods, systems, and computer readable media for providing cloud visibility are disclosed. According to one method, the method includes obtaining at least one correlation profile for indicating effects of workload configurations on hardware and/or software measurements of a reference server, wherein the reference server includes components for measuring hardware and/or software performance. The method also includes configuring the reference server, wherein the reference server is one of a plurality of servers in a cloud-based environment for executing a workload, wherein each of the plurality of servers executes at least a portion of the workload. The method further includes receiving, from the reference server, measurements associated with executing at least the portion of the workload. The method also includes generating information regarding the cloud-based environment using the measurements from the reference server and the at least one correlation profile.

According to one system for providing cloud visibility, the system includes at least one processor. The system includes a controller implemented using the at least one processor. The controller is configured for obtaining at least one correlation profile for indicating effects of workload configurations on hardware and/or software measurements of a reference server, wherein the reference server includes components for measuring hardware and/or software performance; configuring the reference server, wherein the reference server is one of a plurality of servers in a cloud-based environment for executing a workload, wherein each of the plurality of servers executes at least a portion of the workload; receiving, from the reference server, measurements associated with executing at least the portion of the workload; and generating information regarding the cloud-based environment using the measurements from the reference server and the at least one correlation profile.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control or cause the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which.

DETAILED DESCRIPTION

Figure 1:
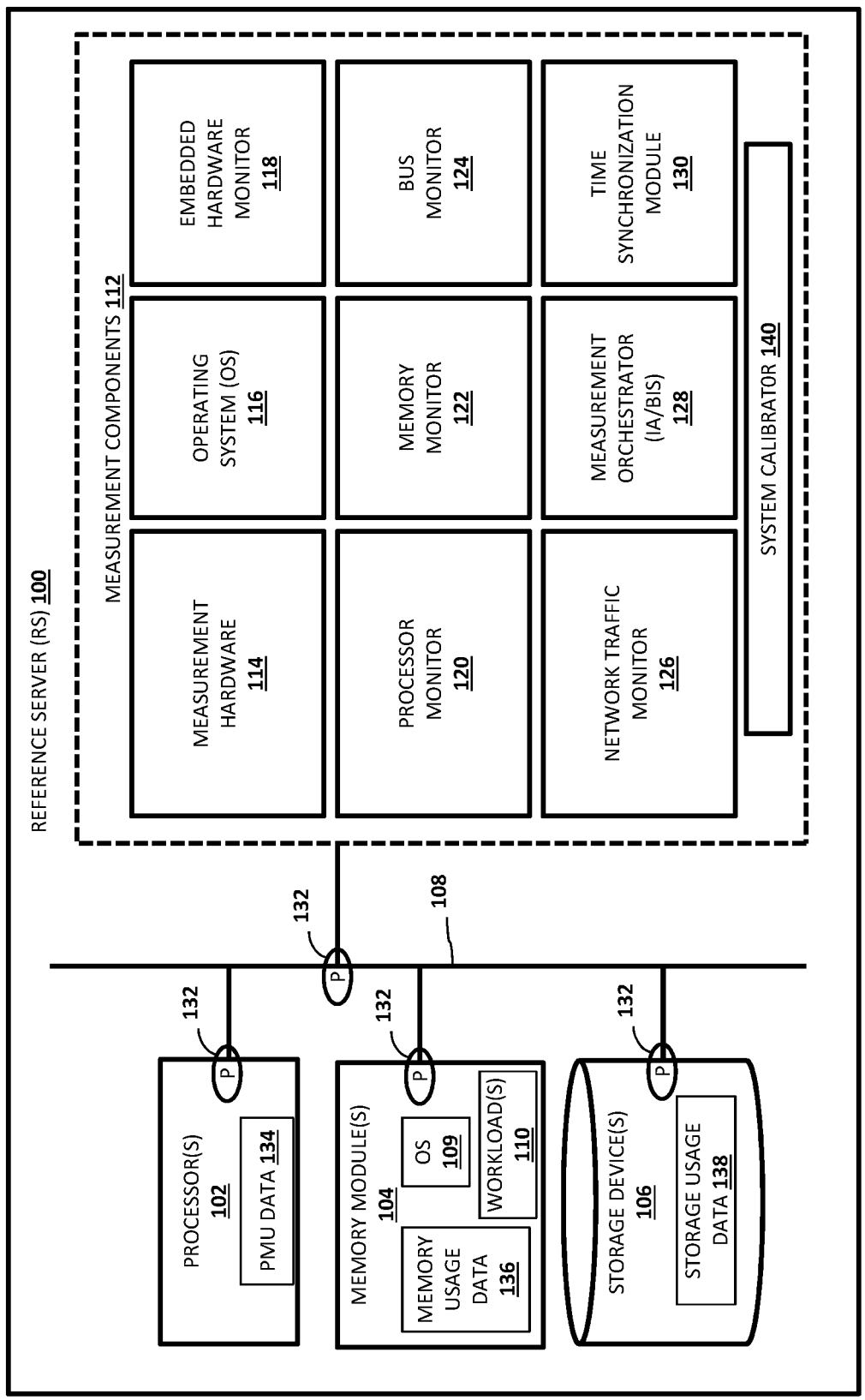
FIG. 1 is a diagram illustrating an example reference server.

The subject matter described herein relates to methods, systems, and computer readable media for providing cloud visibility. Cloud visibility is a term that generally refers to providing information about the behavior and/or characteristics of a cloud-based environment. For example, a cloud-based environment may involve compute, storage, and network resources located in one or more locations (e.g., data centers) that are configured to act as a distributed computing system. To provide cloud visibility, some cloud visibility systems may gather data by performing infrastructure monitoring, machine monitoring, cloud stack monitoring, and/or cloud security monitoring. While such monitoring may be useful to gather some visibility information, lower level (e.g., code execution-level) visibility is lacking from conventional monitoring tools. For example, conventional infrastructure monitoring may involve sensors located in in the computing environment that collect temperature and humidity levels. Such infrastructure monitoring may also monitor power consumption via low-accuracy sampling of cluster power suppliers. However, the measurements from such infrastructure monitoring is generally rough (e.g., coarse or higher-level) and not correlated to the workload(s) (e.g., software or code) being executed by the infrastructure. Similar granularity and precision issues are also associated with conventional machine monitoring (e.g., using probes to detect processor load, the voltage provided to memory or other elements, the load of the graphics card, the amount of memory being used, and/or the speed of cooling fans), cloud stack monitoring (e.g., logging stack related events and data into one or more databases), and cloud security monitoring (e.g., inspecting authentication servers and related authentication procedures to prevent and/or detect unauthorized access).

In accordance with some aspects of the subject matter described herein, equipment, mechanisms, techniques, or methods are disclosed for gathering cloud visibility related information. For example, a reference server (e.g., a computing platform or a module in accordance with one or more aspects described herein) may utilize various hardware- and software-based measurement components to obtain or gather information (e.g., measurements from probes and sensors) about a system or server while the system or server is executing a workload (e.g., one or more sets of tasks, one or more VMs, software, and/or associated traffic). In this example, the reference server or another entity (e.g., an analytics node) may aggregate, analyze, process, and/or convert the gathered data into various formats and/or reports, e.g., by providing charts, graphs, or tables of mean, minimum, and maximum values of a measurement over a time period or a workload.

In accordance with some aspects of the subject matter described herein, equipment, mechanisms, techniques, or methods are disclosed for calibrating a reference server to identify effects of a server configuration on behavior and performance of the reference server and/or its components. For example, a reference server (e.g., a computing platform or a module in accordance with one or more aspects described herein) may be tested with different server configurations. In this example, server calibration may involve collecting measurements and/or other information about the reference server, including components and software, while executing a test workload in each of the different server configurations (e.g., hardware and/or software configurations). In this example, the collected information may be used to create correlation profiles indicating how server configurations (e.g., hardware and/or software configurations) affect behavior and performance of RS 100 or components therein, to gather baseline or "normal" behavior data associated with RS 100 or components therein, and/or other related data.

In accordance with some aspects of the subject matter described herein, equipment, mechanisms, techniques, or methods are disclosed for implemented a distributed computing system that includes a reference server for extrapolating or predicting performance for the distributed computing system or components therein. For example, a distributed computing system may include multiple servers (e.g., physical servers or VMs executing one or more computing platforms) for executing a workload. In this example, a reference server capable of providing granular measurements and/or other data is one of the servers executing the workload or a portion thereof. Continuing with this example, an analytics node or other entity may use the data collected to infer, predict, or extrapolate the performance of the distributed computing system or components therein.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a diagram illustrating an example reference server (RS) 100. In some embodiments, RS 100 may be any suitable entity (e.g., a virtual machine (VM) executing on one or more computing platforms or devices, a physical machine or device, etc.) for executing workloads and for performing testing, measuring, and/or monitoring related actions. In some embodiments, RS 100 may include a server that includes some hardware and software for handling workload(s) 110 (e.g., VMs and/or traffic) in a distributed computing system (e.g., a cloud-based environment) and some other hardware and software for monitoring the hardware and software associated with handling workload(s) 110.

In some embodiments, RS 100 may be configured as a federated or distributed architecture involving semi-autonomous systems that communicate using at least one internal switching fabric or communication bus (e.g., communication bus 108). For example, RS 100 may include a first system (e.g., processor(s) 102, memory module(s) 104, storage device(s) 106 connected to a motherboard) for executing workloads and/or performing related functions and a second system (e.g., measurement components 112 connected to a daughterboard) for monitoring and measuring hardware and software associated with the first system.

In some embodiments, RS 100 may include or utilize various physical components or hardware, e.g., processor(s) 102, memory module(s) 104, storage device(s) 106, and/or at least one communication bus 108. Processor(s) 102 may represent or include a physical processor, a general-purpose microprocessor, a single-core processor, a multi-core processor, a field-programmable gateway array (FPGA), and/or an application-specific integrated circuit (ASIC) for executing workload(s) 110 (e.g., software and/or logic) stored in memory module(s) 104.

Memory module(s) 104 may represent one or more computer readable media or related devices for storing data, logic, or other information. Memory module(s) 104 may be useable for storing data short-term. For example, memory module(s) 104 may include a random-access memory (RAM) module, a flash memory module, or other memory. Memory module(s) 104 may store at least some portion of operating system (OS) 109 and workload(s) 110.

Operating system (OS) 109 may be software for operating RS 100 or a system therein and may be utilized for executing various software applications. In some embodiments, OS 109 may include hypervisor functionality for executing VM instances or virtual containers, e.g., a logical package containing an application and/or a framework with all its dependencies.

Workload(s) 110 may include one or more computing tasks, software, and/or related data. For example, workload(s) 110 may include one or more VM instances and/or virtualization containers, e.g., a logical package containing an application and/or a framework with all its dependencies. In this example, workload(s) 110 may perform various services or functions, such as website services, VM management services, and/or other services. In some embodiments, workload(s) 110 may configured and/or distributed by a tenant or customer of a cloud services provider.

Storage device(s) 106 may be any suitable entity or entities (e.g., a magnetic storage device, an optical storage device, a flash storage device, etc.) for maintaining or storing information related to executing workload(s) 110 or other actions. Storage device(s) 106 may be useable for storing data long-term. In some embodiments, data in storage device(s) 106 may be accessed less frequently than data in memory module(s) 104.

Communication bus 108 may represent one or more communication systems that transfer information between components of RS 100. In some embodiments, communication bus 108 may include hardware components and software, including communication protocols, used for communications between components in RS 100. For example, communication bus 108 may include or interact with a PCI express bus, a USB bus, and/or other bus in RS 100. In this example, communication bus 108 or a portion thereof may use parallel and bit serial connections and various connection topologies.

In some embodiments, communication bus 108 or portion thereof may be used for sending measuring and/or monitoring (MM) related data and/or other information to one or more components in RS 100. For example, in RS 100, communication bus 108 may provide measurements and timestamps from probes 132 to measurement orchestrator 128 or another measurement components 112.

Measurement components 112 may be any suitable entities (e.g., software executing on at least one processor, hardware, FPGAs, etc.) for performing one or more MM related actions. Example MM related actions may include querying probes or sensors associated with hardware and/or software in RS 100, using APIs to read or obtain measurements or metrics, monitoring network traffic, performing internal time synchronization management, orchestrating measurements from various sources, aggregating and/or analyzing data, and/or providing visibility related data in various formats or reports. Example MM related data may include measurements and timestamps from various probes, sensors, and/or monitoring software, statistics or aggregated metrics associated with MM related data, and/or usage data from various components.

In some embodiments, at least some of measurement components 112 may be located on a measurement circuit board (e.g., a daughterboard) separate from a main circuit board (e.g., a motherboard) of RS 100. For example, RS 100 may include a main circuit board (e.g., a motherboard) for executing workload(s) 110 or portions thereof. In this example, the main circuit board may include or connect various components, e.g., processor(s) 102, memory module(s) 104, and storage device(s) 106. Continuing with example, RS 100 may also include a daughterboard containing or connecting measurement components 112 usable for testing and monitoring the main circuit board.

In some embodiments, measurement components 112 may include measurement hardware 114 for supporting various testing, measuring, and/or monitoring related actions. For example, measurement hardware 114 may include an expansion circuit board (e.g., a daughterboard) that includes one or more processors and/or one or more FPGAs. In some embodiments, measurement hardware 114 may be utilized to avoid overloading processor(s) 102 of RS 100 and/or to avoid affecting the server's performance due to testing, measuring, and/or monitoring related actions. For example, measurement hardware 114 may include a dedicated measurement framework card inserted on a PCIe or internal USB bus, where the card includes a high-speed ARM processor. In this example, the card may also include an additional measurement co-processor, e.g., a dedicated FPGA, for helping collect and process MM related data. In some embodiments, measurement hardware 114 may include an independent Ethernet card to avoid interfering with or impeding regular traffic (e.g., non-measurement related traffic) and the workload execution performance of the server. In some embodiments, measurement hardware 114 may also include a power supply module for providing additional power to various measurement components 112, e.g., processors, FPGAs, and embedded source measure units or source measurement units (SMUs).

Measurement components 112 may include testing and/or measurement (TM) equipment 132 (e.g., power measurement probes, SMUs, etc.) for monitoring power consumption and/or other aspects in cards and/or components in RS 100. For example, embedded hardware monitor 118 may use power measurement probes to determine an overview of the power consumption of RS 100. In this example, the probes may be connected to major parts of the server architecture, e.g. but not limited to processor(s) 102, memory module(s) 104, storage device(s) 106, a communication bus 108, a PCI express controller and/or related bus, a USB controller and/or related bus, and/or a graphics card.

Measurement components 112 may include a measurement OS 116. OS 116 may be an operating system and/or other software executing on measurement hardware 114. In some embodiments, OS 116 may be based on a Linux or Unix kernel. OS 116 may be for executing or running various measurement components 112 or related actions. For example, OS 116 may include various drivers for interacting with sensor equipment mounted onboard RS 100 and usable for collecting and processing sensor information.

Measurement components 112 may include an embedded hardware monitor 118. Embedded hardware monitor 118 may be any suitable entity (e.g., software executing on at least one processor, etc.) for reading or obtaining data from embedded (e.g., legacy) hardware sensors. For example, RS 100, like some commercial off-the-shelf (COTS) servers, may be equipped with hardware sensors commonly used for thermal management or overclocking. In this example, such sensors may have APIs that can be accessed by an OS. Continuing with this example, embedded hardware monitor 118 may be configured to use sensor APIs to collect information from the legacy sensors and send it to one or more measurement components 112 for processing.

In some embodiments, embedded hardware monitor 118 or related functionality may execute on a main circuit board (e.g., processor(s) 102 and OS 109) of RS 100. In some embodiments, embedded hardware monitor 118 or related functionality may execute on a measurement circuit board (e.g., measurement hardware 114 and OS 116) of RS 100.

Measurement components 112 may include a processor monitor 120. Processor monitor 120 may be any suitable entity (e.g., software executing on at least one processor, etc.) for reading processor measurement units (PMUs) registries of processor(s) 102. For example, processor monitor 120 may include a software application able to configure and read PMU data 134 from the onboard PMUs of processor(s) 102. In some embodiments, processor monitor 120 may be able to read PMU data 134 from either a processor it is currently running on or any other processor. In some embodiments, processor monitor 120 may utilize one or more APIs from processor manufacturers to obtain PMU data 134.

In some embodiments, processor monitor 120 or related functionality may execute on a main circuit board (e.g., processor(s) 102 and OS 109) of RS 100. In some embodiments, processor monitor 120 or related functionality may execute on a measurement circuit board (e.g., measurement hardware 114 and OS 116) of RS 100.

In some embodiments, measurement components 112 may include random access memory (RAM) or other memory modules containing power management sensors and a TM API for interacting with these sensors. For example, memory module(s) 104 may include power management functionality (e.g., a power management integrated circuit) and/or related sensors. In this example, a power management TM API may be utilized to allow sensor readings via one or more measurement components 112 (e.g., memory monitor 122 and/or OS 116) without requiring additional probes or SMUs to be added.

Measurement components 112 may include a memory monitor 122. Memory monitor 122 may be any suitable entity (e.g., software executing on at least one processor, etc.) for reading memory usage data 136, e.g., memory pages and ownership traces, associated with memory module(s) 104. For example, memory monitor 122 may include a software application able to trace how memory module(s) 104 (e.g., RAM) is handling different memory pages, which process owns the memory pages, the flow of the usage (e.g., from-to), and which storage device(s) 106 or hard drive therein is used. In this example, memory monitor 122 may use memory usage data 136 for detecting abnormal or undesired behaviors, e.g., memory leakage and spilling between applications. In some embodiments, memory monitor 122 may utilize one or more APIs from memory manufacturers to obtain memory usage data 136.

In some embodiments, memory monitor 122 or related functionality may execute on a main circuit board (e.g., processor(s) 102 and OS 109) of RS 100. In some embodiments, memory monitor 122 or related functionality may execute on a measurement circuit board (e.g., measurement hardware 114 and OS 116) of RS 100.

Measurement components 112 may include a bus monitor 124. Bus monitor 124 may be any suitable entity or entities (e.g., software executing on at least one processor, etc.) for monitoring and/or analyzing communication bus 108 and/or other buses (e.g., a PCI express bus, a graphic card bus, and/or a USB bus). For example, RS 100 may include multiple buses and bus controllers that are used to exchange information, e.g., between applications and/or components. In this example, bus monitor 124 may include one or more software applications configured to monitor or determine bus traffic load, bus performance, and process usage (e.g., traffic end-points and which process requested bus transit) associated with one or more of the buses in RS 100. In some embodiments, bus monitor 124 may utilize one or more TM equipment 132 and APIs to obtain bus usage data.

In some embodiments, bus monitor 124 or related functionality may execute on a main circuit board (e.g., processor(s) 102 and OS 109) of RS 100. In some embodiments, bus monitor 124 or related functionality may execute on a measurement circuit board (e.g., measurement hardware 114 and OS 116) of RS 100.

Measurement components 112 may include a network traffic monitor 126. Network traffic monitor 126 may be any suitable entity or entities (e.g., software executing on at least one processor, etc.) for monitoring and/or collecting network traffic statistics, traffic types data, and/or process ownership of traffic. For example, network traffic monitor 126 may perform packet captures, packet traces, and partial on-the-fly analysis of captured packets.

In some embodiments, network traffic monitor 126 may be configured to be aware of virtual machines, virtual processes, and/or virtual resources. For example, network traffic monitor 126 may monitor traffic or types thereof associated with a first level or a virtualized process, may filter certain traffic or types thereof, may determine or identify a virtual machine (VM) or virtual resource utilizing a particular NIC, may determine an end-point of a specific traffic flow (e.g., in order to identify packets from or to botnet systems), and may compute or determine network traffic load on a NIC. In some embodiments, network traffic monitor 126 may include one or more software applications configured to monitor or interact with one or more NICs. In some embodiments, network traffic monitor 126 may utilize TM equipment 132 and/or APIs to obtain network traffic data.

In some embodiments, network traffic monitor 126 or related functionality may execute on a main circuit board (e.g., processor(s) 102 and OS 109) of RS 100. In some embodiments, network traffic monitor 126 or related functionality may execute on a measurement circuit board (e.g., measurement hardware 114 and OS 116) of RS 100.

Measurement components 112 may include a measurement orchestrator 128. Measurement orchestrator 128 may be any suitable entity (e.g., software executing on at least one processor, etc.) for collecting MM related data from TM equipment 132 (e.g., hardware and software probes), aggregating and storing the MM related data, and/or forwarding the MM related data to an analytics and/or business intelligence service. For example, measurement orchestrator 128 may include a software application for orchestrating different TM equipment 132 (e.g., sensors and probes), collecting MM related data, saving the MM related data, and performing computations for extracting statistics or metrics (e.g., key performance indicators (KPIs), performing time alignment between measurements, and/or performing cross-domain analysis and correlation associated with different infrastructure components.

In some embodiments, measurement orchestrator 128 or related functionality may execute on a main circuit board (e.g., processor(s) 102 and OS 109) of RS 100. For example, measurement orchestrator 128 may include an orchestration driver that resides in OS 109 and may be able to collect and send the MM related data to one or more measurement component 112, e.g., via communication bus 108. In some embodiments, measurement orchestrator 128 or related functionality may execute on a measurement circuit board (e.g., measurement hardware 114 and OS 116) of RS 100. For example, measurement orchestrator 128 may include software executing in OS 116 and/or measurement hardware 114 and may configure and manage various monitoring applications, e.g., embedded hardware monitor 118, processor monitor 120, memory monitor 122, bus monitor 124, network traffic monitor 126, etc.

Measurement components 112 may include a time synchronization module 130. Time synchronization module 130 may be any suitable entity (e.g., software executing on at least one processor, etc.) for synchronizing clocks among TM equipment 132 and/or measurement components 112 so as to align timestamps and/or facilitate correlation of MM related data from various components in RS 100. For example, time synchronization module 130 may include a software application for performing internal time synchronization. In some embodiments, time synchronization module 130 may perform time synchronization based on a bus clock associated with a communication bus (e.g., communication bus 108) that connects a main circuit board and a measurement daughterboard. In some embodiments, time synchronization module 130 may perform time synchronization based on an IEEE 1588 standard. In such embodiments, the IEEE 1588-based time synchronization may be usable for synchronizing events between different RSs 100 in cloud-based environment 200.

In some embodiments, time synchronization module 130 or related functionality may execute on a main circuit board (e.g., processor(s) 102 and OS 109) of RS 100. In some embodiments, time synchronization module 130 or related functionality may execute on a measurement circuit board (e.g., measurement hardware 114 and OS 116) of RS 100.

Measurement components 112 may include or interact with a system calibrator 140. System calibrator 140 may be any suitable entity (e.g., software executing on at least one processor, etc.) for performing calibration of RS 100. For example, server calibration may involve a process for collecting measurements and/or other information about RS 100, including components (e.g., processor(s) 102, memory module(s) 104, storage device(s) 106) and software being executed (e.g., workload(s) 110 and related applications), during one or more server configurations (e.g., hardware and/or software configurations). In this example, the collected information may be used to create correlation profiles indicating how server configurations (e.g., hardware and/or software configurations) affect behavior and performance of RS 100 or components therein, to gather baseline or "normal" behavior data associated with RS 100 or components therein performances, and/or other related data.

In some embodiments, calibration of RS 100 may be used to determine, identify, or understand baseline or "normal" behavior for cloud stack components or combinations thereof. For example, server calibration of RS 100 may generate correlation profiles for different cloud stack layers, e.g., transport, network, and application layers and various combinations thereof, as various workloads are executed. In this example, the correlation profiles may include one or more behavioral models indicating how interaction between one or more stack components affect workload execution or performance of RS 100 or components therein.

In some embodiments, calibration of RS 100 may be used to determine, identify, or understand baseline or "normal" behavior when executing an application, a service, or a code portion. For example, server calibration of RS 100 may generate correlation profiles for different software packages and applications. In this example, the correlation profiles may include a power consumption map indicating the amount of power consumed by various components during the execution of an application, a service, or a code portion. In this example, the power consumption map may also indicate the amount of power consumption for the components at different points in time (e.g., every second or every 10 second) and correlate changes in power consumptions to the code portion(s) being executed.

In some embodiments, a correlation profile may indicate for indicating effects of workload configurations on hardware and/or software measurements of a reference server. In some embodiments, a correlation profile may indicate baseline or "normal" values for various performance aspects of RS 100 and/or components therein. In some embodiments, a correlation profile may also indicate various threshold values for indicating abnormal behaviors or severity of such behaviors. For example, a correlation profile may include baseline power consumption values for RS 100 or components therein based on various factors, e.g., length of workload, type of workload, etc. In this example, the correlation profile may also indicate that if detected power consumption values exceed the baseline values by 5%, the detected values indicate likely benign behavior, but if detected power consumption values exceed the baseline values by 50% or more, the detected values indicate likely malicious behavior. In another example, a correlation profile may indicate that for every 10% detected values exceed baseline values, an abnormality score may increase by 1 (e.g., on a scale of 0-10).

In some embodiments, RS 100 may utilize one or more measurement components 112 for observing various aspects of software execution and related effects to behavior and performance of RS or components therein. For example, using various power consumption measurements during execution of an application or portion thereof and using one or more correlation profiles that indicate baseline or "normal" behavior, RS 100, measurement orchestrator 128, or another entity (e.g., an analytics node) may identify whether a code portion is potentially malicious (e.g., if the detected measurements exceed an acceptable threshold or tolerance level as indicated by the correlation profiles). In another example, using various measurements during execution of an application or portion thereof and using one or more correlation profiles that indicate baseline or "normal" behavior, RS 100, measurement orchestrator 128, or another entity (e.g., an analytics node) may identify potential breaches in security and application isolation due to memory leaks (e.g., if detected measurements in memory module(s) 104 exceed an acceptable threshold or tolerance level as indicated by the correlation profiles).

In some embodiments, RS 100 or measurement components 112 therein may be configured to monitor and measure various aspects of RS 100 while a software component (e.g., an application or code portion thereof) is executing. For example, RS 100 or another entity may use detected measurements associated with an executing software component to understand its impact on the performance of RS 100 and, by extrapolation, other machine in a cloud-based environment. In this example, by analyzing measurements obtained while executing workload(s) 110, RS 100 or another entity may be able to understand and/or predict the performance of each software component and how it affects an individual machine including, for example, code optimization, power consumption, and/or machine security and/or breaches.

In some embodiments, RS 100 or measurement components 112 therein may be utilized for power optimization and/or related profiling of the machine, for improving cloud security at lower levels (e.g., by identifying potentially malicious code or suspicious behavior, preventing infrastructural damages due to malicious code, by identifying potential memory leaks between applications in memory module(s) 104), and/or for improving network function virtualization services (e.g., by identifying communication stack optimization issues, traffic routing problems, improper optical modulations for given traffic).

It will be appreciated that FIG. 1 is for illustrative purposes and that various nodes and/or components, modules, locations, and/or functionality described above in relation to FIG. 1 may be changed, altered, added, or removed.

Figure 2:
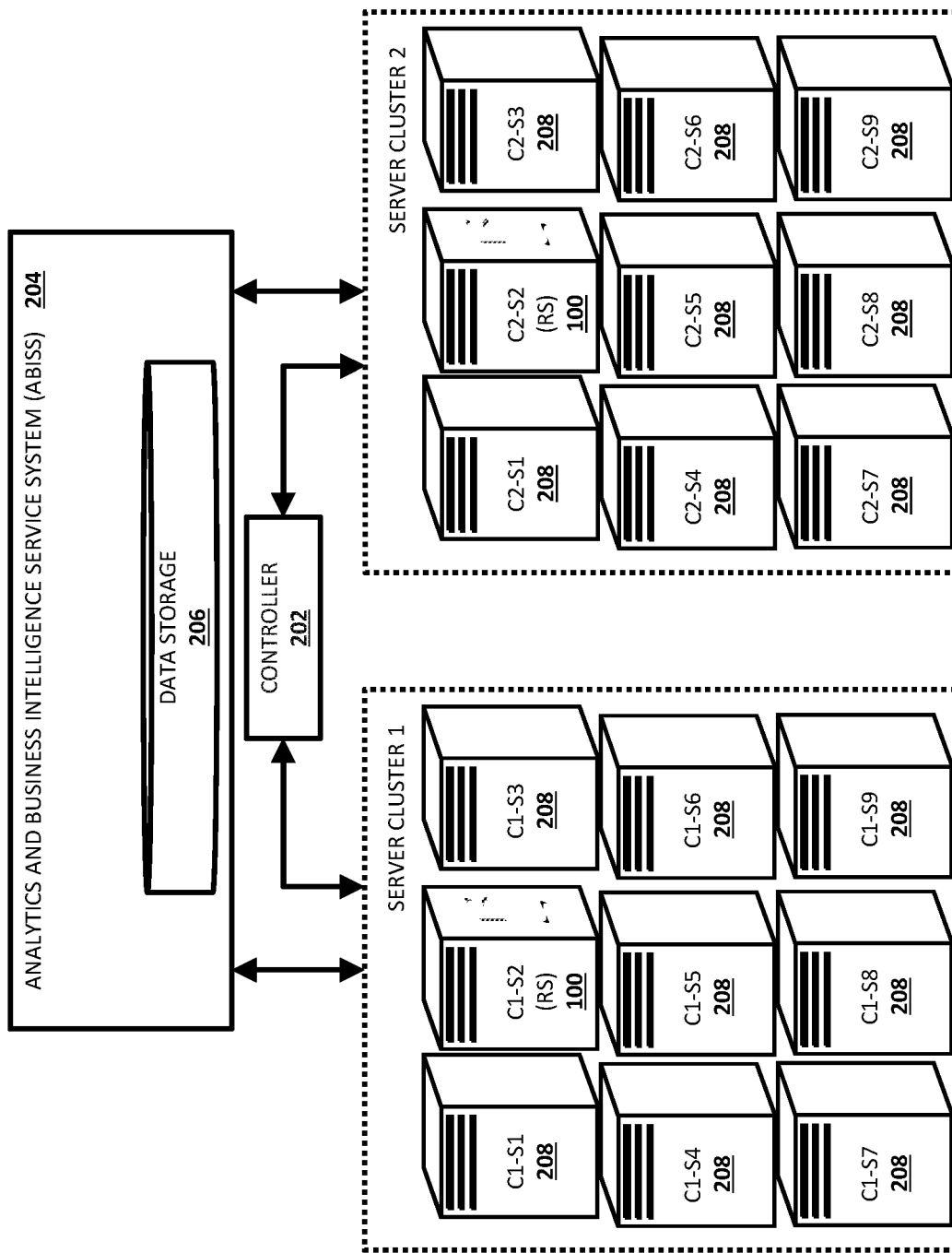
FIG. 2 is a diagram illustrating an example cloud-based environment.

FIG. 2 is a diagram illustrating an example cloud-based environment 200. Cloud-based environment 200 may include infrastructure, such as servers, nodes, and/or components, configured to act as a distributed computing system. In some embodiments, cloud-based environment 200 may include compute, storage, and network resources that are configured for use a single tenant or customer. For example, a cloud services provider may own compute, storage, and network resources that can be shared among multiple tenants or customers. In this example, the shared resources may be utilized such that each tenant's cloud-based environment, including workloads and data, is private or inaccessible by unauthorized parties (e.g., other tenants).

In some embodiments, cloud visibility and/or related metrics may be determined using a software-based visibility solution involving measurement components 112 that are software-based only. For example, measurement components 112 may be software executed by OS 109 and/or processor(s) 102 and may collect available measurement information, e.g., by reading MM related data from pre-existing probes and/or sensors associated with processor(s) 102, memory module(s) 104, and/or storage device(s) 106. In some embodiments, such measurement software may be implemented in every server (e.g., servers 208 and RSs 100) in cloud-based environment 200. In such embodiments, costs related to additional measurement hardware 114 and/or TM equipment 132 may be avoided.

In some embodiments, cloud visibility and/or related metrics may be determined using a fully instrumented visibility solution involving only RSs 100. For example, in a testing scenario or other feasible scenario, cloud-based environment 200 may only use RSs 100 in its server clusters. In this example, cloud visibility may be significantly improved since each RS 100 can provide significant MM related data while executing workloads.

In some embodiments, cloud visibility and/or related metrics may be determined using a hybrid visibility solution involving one or more RSs 100 containing at least some hardware-based measurement components 112 and servers 208 with software-based only measurement components 112. For example, each of servers 208 may include software-based measurement components 112 for collecting measurement information, e.g., by reading MM related data from pre-existing probes and/or sensors associated with processor(s) 102, memory module(s) 104, storage device(s) 106 and each RS 100 may include hardware-based and software-based measurement components 112 for collecting measurement information. By collecting at least some MM related data from both types of servers, increased cloud visibility may be provided and with lower costs and complexities than a fully instrumented visibility solution.

In some embodiments, to facilitate cloud visibility involving multiple RSs 100, an analytics and/or business information service system (ABISS) 204 may be utilized and may aggregate data from multiple sources (e.g., RSs 100) and may perform monitoring and data correlation for cloud-based environment 200. For example, each RS 100 in cloud-based environment 200 may forward measurement information to ABISS 204 for performing larger scope data analysis and correlation.

In some embodiments, ABISS 204 may be a stand-alone node or device configured to provide data feedback. For example, ABISS 204 may be a centralized node for receiving MM related data from multiple RSs 100.

In this example, ABISS 204 may aggregate and analyze data to provide statistics, visuals, and/or other feedback. In some embodiments, ABISS 204 may compute and/or provide feedback associated with a particular RS 100, a particular server cluster, one or more networks, a group of RSs 100 or server clusters, or cloud-based environment 200.

In some embodiments, ABISS 204 may be co-located or integrated with each RS 100 and configured to provide data feedback. For example, measurement orchestrator 128 in RS 100 may include an analytics and/or business information service for providing insights into what is happening locally (e.g., in RS 100).

Referring to FIG. 2, cloud-based environment 200 may include a controller 202, ABISS 204, and one or more servers, e.g., servers 208 and RSs 100. Controller 202 may be any suitable entity (e.g., software executing on at least one processor, one or more computing platforms, etc.) for performing one or more functions related to controlling cloud-based environment 200, RS 100, or components therein. Example controller functions may include assigning and/or initiating workload(s) 110, configuring RS 100 or other servers, initiating server calibration, configuring resources, initiating testing, and/or facilitating and/or performing data analysis involving measurements from RSs 100. For example, controller 202 may act as a cloud/VM orchestrator for configuring a tenant's cloud and/or resources thereof for executing workload(s) 110. In another example, controller 202 may act as a configuration module for configuring a single VM, RS 100, server 208, or other entity. In this example, the configuration module may be integrated with an existing node or device, e.g., RS 100 or server 208.

In some embodiments, controller 202 may include one or more communications interfaces, e.g., for communicating with servers 208, RSs 100, ABISS 204, and/or other nodes.

In some embodiments, controller 202 may be a stand-alone entity (e.g., network node) communicatively connected to RSs 100, ABISS 204 and/or data storage 206. For example, ABISS 204 and controller 202 may be implemented in separate computing platforms or as separate VM instances and may be connected via one or more communications interface, e.g., using Internet protocol (IP) and/or network interface cards (NICs).

In some embodiments, controller 202 or related functionality may be integrated and/or part of RS 100. For example, RS 100 and controller 202 may be implemented in a same node or computing platform or may be functionality in a same VM instance. In some embodiments, a user (e.g., a tenant or network operator) may configure RS 100 via controller 202 using an API, a GUI, and/or other communication interfaces. For example, a user may configure each RS 100 to analyze and provide data feedback via its local analytics service or via ABISS 204.

In some embodiments, controller 202 may be integrated and/or part of ABISS 204. For example, ABISS 204 and controller 202 may be implemented in a same node or computing platform or may be functionality in a same VM instance. In this example, ABISS 204 and controller 202 may communicate using an internal switching fabric, communication bus 108, and/or other communication interfaces. In another example, ABISS 204 and controller 202 may communicate using IP and/or NICs.

ABISS 204 may be any suitable entity (e.g., software executing on at least one processor, one or more computing platforms, etc.) for performing one or more functions related to performing data analytics and/or business intelligence. Example ABISS functions may include providing cloud visibility data and/or other information associated with cloud-based environment 200 or infrastructure therein. In some embodiments, ABISS 204 may include one or more communications interfaces, e.g., APIs and GUIs, for communicating with users or other entities, e.g., RSs 100 and/or controller 202.

In some embodiments, ABISS 204 may include functionality for accessing data storage 206. Data storage 206 may be any suitable entity or entities (e.g., a storage device, a non-transitory computer readable medium, or a storage system) for maintaining or storing information related to providing cloud visibility. For example, data storage 206 may contain information usable for generating and/or maintaining metrics (e.g., statistics) associated with one or more workflow(s) 110. Example storage information may include server reports, workload(s) 110, measurements, metrics, and/or server calibration data, one or more correlation profiles associated with RSs 100, baseline behavior data associated with RSs 100, and/or other information. In some embodiments, data storage 206 may be located at ABISS 204, controller 202, another node, or distributed across multiple platforms or devices.

In some embodiments, data storage 206 may be accessible by one or more server clusters or servers therein, e.g., servers 208 and RSs 100. In some embodiments, each server cluster may include one or more servers 208 and at least one RS 100. For example, server cluster '1' and server cluster '2' may include nine servers, where at least one is an RS 100, e.g., server 'C1-S2' and server 'C2-S2'.

In some embodiments, each server 208 and RS 100 may be configured to perform a similar task or portion of a workload. For example, each server 208 in server cluster '1' and server cluster '2' may include or utilize a customer defined VM instance executing on a physical computing platform (e.g., a rack server) and each RS 100 may also include or utilize the customer defined VM instance executing on a different physical computing platform. In this example, the customer defined VM instance may include a workload or portion thereof to be executed.

In some embodiments, in addition to hardware and software for executing workload(s) 110 or a portion thereof, each RS 100 may include measurement components 112, e.g., hardware and/or software probes and sensors. For example, each of RSs 100 and servers 208 in server clusters '1' and '2' may be configured for a "compute" role only. In this example, each RS 100 may analyze the performance of the stack software and may analyze the customer applications or VMs being executed. By executing the same software stack, the performance of servers 208 in a server cluster may be assumed to be similar to the performance of RS 100 in the server cluster. As such, measurements and/or other monitor data from RS 100 may be usable to predict or extrapolate cloud visibility information, e.g., various performance aspects like aggregated performance metrics and statistics. Further, if the relative number of RSs 100 in cloud-based environment 200 is increased in relation to the number of servers 208, the cloud visibility information generated may be more accurate and precise.

In some embodiments, servers 208 may be configured to perform at least some software-based monitoring and/or measuring. For example, while it may not be feasible to replace all servers 208 with RSs 100 in cloud-based environment 200, it may be possible to deploy software monitors (e.g., software-based probes) in all servers 208 as functionality in an underlying (e.g., bare metal) OS. In this example, using servers 208 to provide additionally visibility data may significantly improve cloud visibility information generated while keeping related cost at an acceptable level.

In some embodiments, each of RSs 100 may report to ABISS 204 or related data storage 206. For example, ABISS 204 may provide automated big data analysis using the reports from RSs 100, e.g., by correlating measurements from different parts of the infrastructure of cloud-based environment 200. In this example, ABISS 204 may also provide a user- or business-friendly dashboard capable of data visualization and/or various reports.

In some embodiments, each of RSs 100 may include functionality for performing at least some data analysis and provide data feedback. For example, measurement orchestrator 128 may be capable of providing a dashboard or GUI for MM related data and may also provide an API for probing control and/or configuration purposes.

It will be appreciated that FIG. 2 is for illustrative purposes and that various nodes and/or components, modules, locations, and/or functionality described above in relation to FIG. 2 may be changed, altered, added, or removed.

Figure 3:
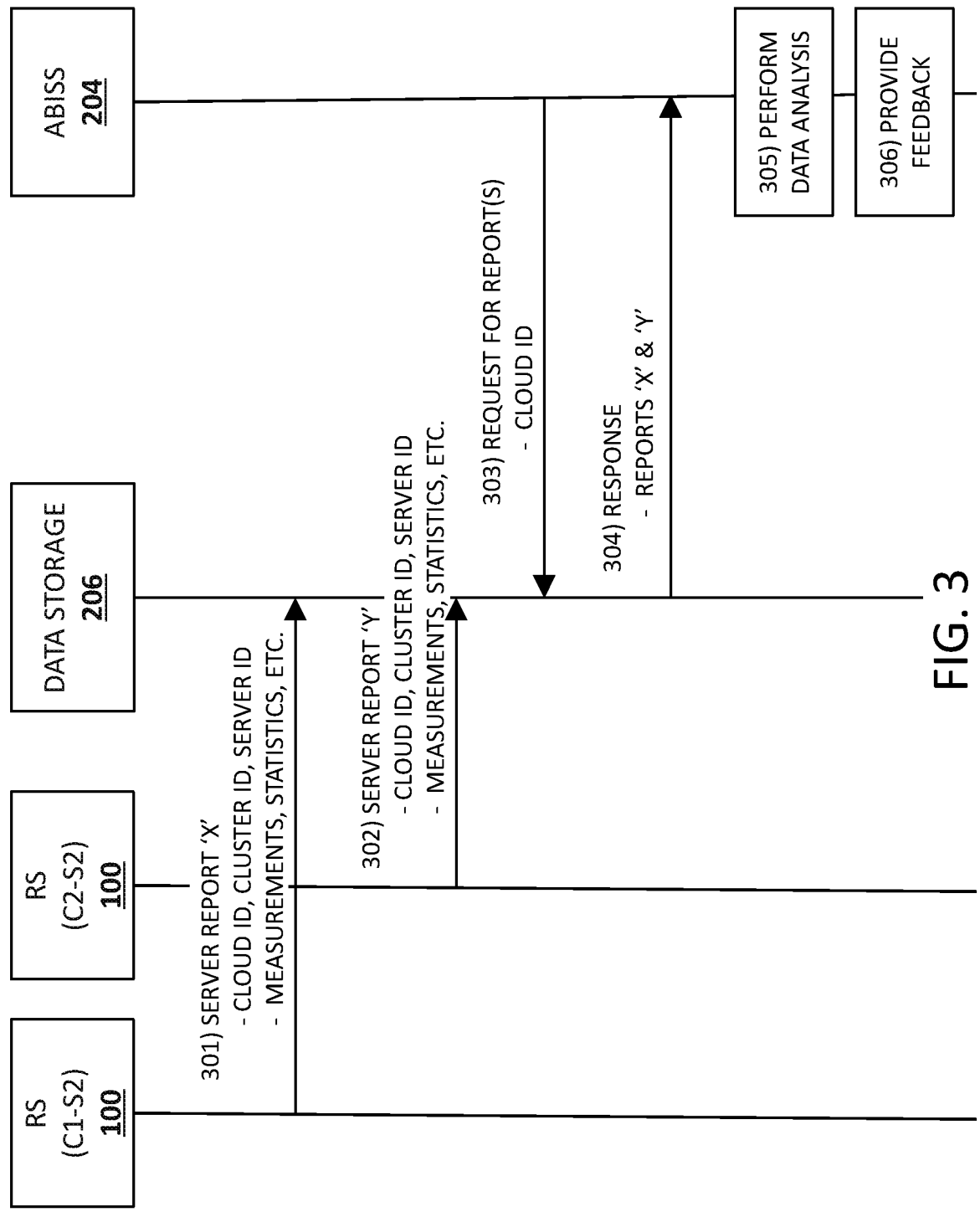
FIG. 3 is a diagram illustrating example communications for gathering measurements from a cloud-based environment.

FIG. 3 is a diagram illustrating example communications for gathering measurements from cloud-based environment 200. In some embodiments, cloud-based environment 200 may include one or more RSs 100. In some embodiments, each RS 100 in cloud-based environment 200 may obtain and store measurements and/or related data (e.g., statistics, derived metrics, predicted scores, etc.) for a given workload, customer, and/or time period. In some embodiments, measurements and/or related data may be sent to, provided to, and/or stored at an externally accessible storage device or platform, e.g., data storage 206. In some embodiments, ABISS 204 or another entity may access the measurements and/or related data to perform larger scope data analysis and/or provide various feedback, e.g., using graphs, tables, and/or other visuals.

Referring to FIG. 3, in step 301, a first RS 100, using measurement orchestrator 128, OS 116, and/or another component, may generate and send a server report 'X' to data storage 206. For example, RS 100 may include one or more identifiers in a server report containing MM related data. In this example, the identifier 'C1-S2' indicates that RS 100 is in a server cluster '1' and has the server number '2'. Continuing with this example, the server report may also include a cloud identifier, a workload identifier, a customer identifier, and/or a timestamp for identification and/or analysis purposes.

In step 302, a second RS 100, using measurement orchestrator 128, OS 116, and/or another component, may generate and send a server report 'Y' to data storage 206. For example, RS 100 may include one or more identifiers in a server report containing MM related data. In this example, the identifier 'C2-S2' indicates that RS 100 is in a server cluster '2' and has the server number '2'. Continuing with this example, the server report may also include a cloud identifier, a workload identifier, a customer identifier, and/or a timestamp for identification and/or analysis purposes.

In step 303, ABISS 204 may request server reports and/or related data from data storage 206. For example, ABISS 204 may send a message containing a cloud identifier or other information for indicating which reports should be sent to ABISS 204.

In step 304, data storage 206 may send the server reports and/or related data to ABISS 204. For example, data storage 206 may send one or more reports from RSs 100, including reports 'X' and 'Y', to ABISS 204.

In step 305, ABISS 204 may perform data analysis using the server reports and/or related data from data storage 206. For example, ABISS 204 may analysis the server reports to determine a total power consumption for workload(s) 110, e.g., by multiplying the number of servers used to execute workload(s) 110 and the power consumption measured at one RS 100 during the execution of the workload. In another example, ABISS 204 may analysis the server reports to identify whether any suspicious or abnormal behaviors occurred, e.g., execution of malicious code or potential memory leaks.

In step 306, ABISS 204 may provide feedback regarding cloud-based environment 200 or related workload(s) 110. For example, ABISS 204 may utilize one or more APIs and/or GUIs to provide a cloud visibility dashboard. In this example, the cloud visibility dashboard may allow a user to view reports, charts, tables, and/or graphs. indicating various measurements and metrics associated with the infrastructure (e.g., servers and components) in cloud-based environment 200.

It will be appreciated that FIG. 3 is for illustrative purposes and that different and/or additional messages and/or actions may be used for providing cloud visibility, system calibration, obtaining or monitoring hardware and/or software measurements, and/or related actions. It will also be appreciated that various messages and/or actions described herein with regard to FIG. 3 may occur in a different order or sequence.

Figure 4:
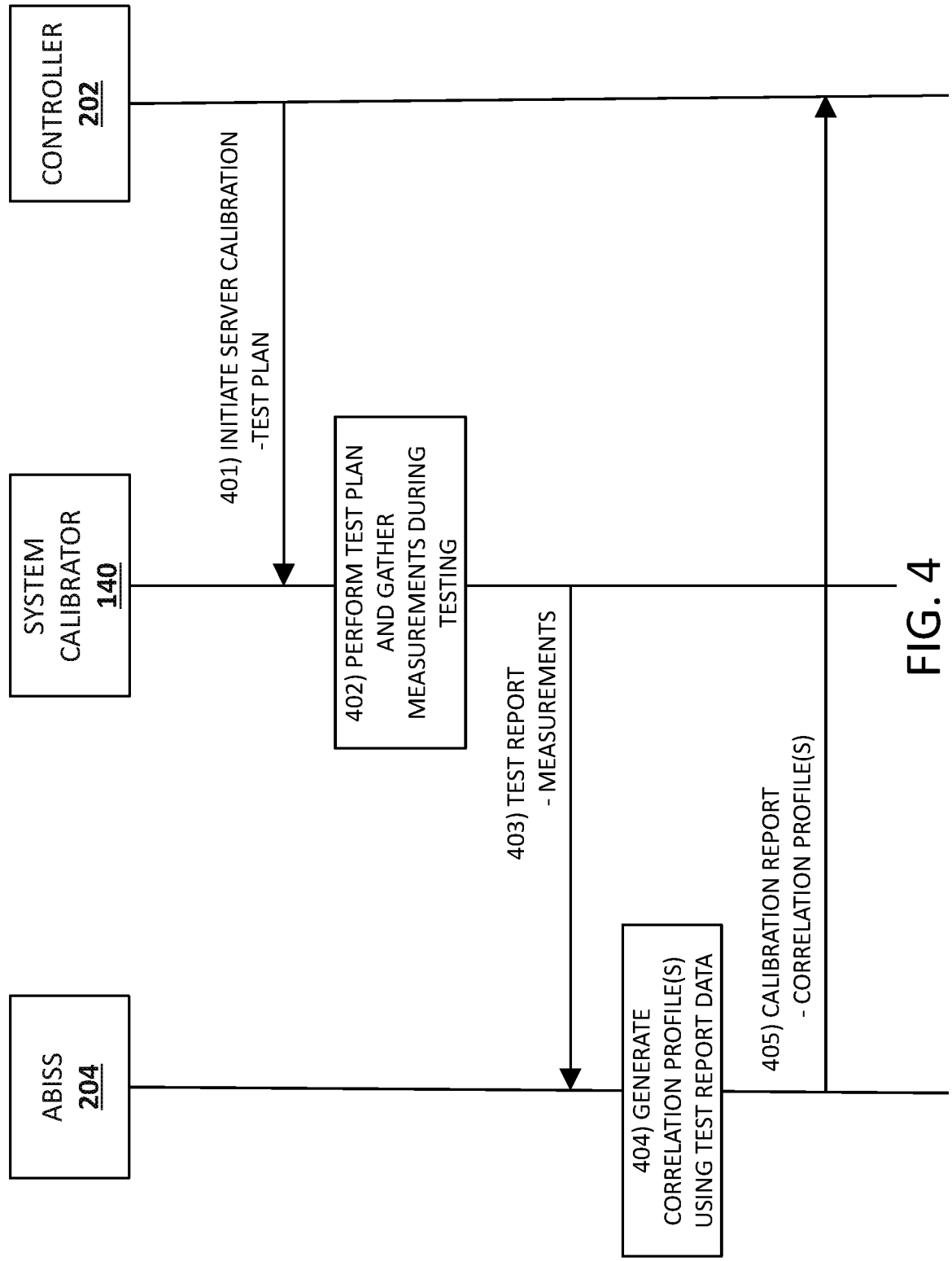
FIG. 4 is a diagram illustrating example communications for performing server calibration.

FIG. 4 is a diagram illustrating example communications for performing server calibration. In some embodiments, controller 202 may be configured for initiating system calibration on RS 100. In some embodiments, system calibration may involve testing one or more physical and/or software configurations of RS 100. For example, controller 202 may initiate a test plan that involves RS 100 or related component (e.g., system calibrator 140) to execute workloads under different configurations while probes and/or other measurement components 112 in RS 100 are used for gathering real-time or near real-time feedback and/or measurements (e.g., power consumption metrics, resource usage metrics, etc.) during execution of the workloads. In this example, the controller or another entity (e.g., ABISS 204) may generate calibration output, e.g., one or more correlation profiles and/or baseline behavior data, for RS 100 and/or related components (e.g., compute resource that can be used to detect abnormal or unusual behaviors (e.g., potentially malicious behaviors) when execution of other (e.g., non-test related) workloads.

In some embodiments, system calibration for RS 100 may be automated or semi-automated. For example, a calibration process may be automated in a test network or calibration lab. In this example, calibration may be performed overnight or at length with little to no human oversight. Continuing with this example, after the series of tests are completed, a human operator or other entity may review and/or modify the measurements, the correlation profiles, and/or other calibration data.

In some embodiments, system calibration for RS 100 may be initiated prior to customer deployment and/or usage. For example, configuration and calibration of RS 100 may be performed for every different server configuration (e.g., hardware and/or software configurations) available for customer use in cloud-based environment 200. In this example, a test provider or network operator may build and/or calibrate one or more RSs 100 for each of these different server configurations. Continuing with this example, the test provider or network operator may store calibration output, e.g., one or more correlation profiles and/or baseline behavior data, for these different server configurations and can provide appropriate calibration output to appropriate entities based on the server model(s) deployed.

In some embodiments, lower accuracy calibration may be performed or provided by using calibration data based on predetermined server configurations that may or may not be available for deployment. In this example, a pre-existing correlation profile and/or other calibration data may be selected by identifying calibration data associated with one of the predetermined server configurations closest to the actual server configuration being deployed.

Referring to FIG. 4, in step 401, controller 202 may initiate server calibration of RS 100. For example, controller 202 may send a message to system calibrator 140 or another component of RS 100 for initiating a test plan or calibration plan.

In step 402, RS 100, using system calibrator 140 and/or another component, may perform a test plan or calibration plan and may gather measurements during the testing. For example, RS 100 may perform a series of tests. In this example, each test may involve one or more workloads and/or one or more hardware and/or software configurations for RS 100. Continuing with this example, RS 100 may change its configuration as required for each test and obtain various measurements using measurement components 112 and may use these measurements and/or other data to generate at least one or more correlation profiles and/or baseline behavior data for RS 100 and/or various components therein.

In some embodiments, a test plan or calibration plan may include executing one or more tests in a variety of conditions and/or server configurations and obtaining measurements from RS 100 and/or various components therein. For example, a test plan or calibration plan may include testing that includes executing one or more workloads associated with a basic input/output system (BIOS) or firmware, testing that includes executing one or more workloads associated with a cloud-focused OS with different configurations, testing that includes executing one or more workloads associated with one or more different cloud configurations involving various stack components, and/or testing that includes executing one or more workloads associated with different software configurations.

In some embodiments, a test plan or calibration plan may include performing tests that focus on various components or aspects of RS 100. For example, a test plan or calibration plan may include testing different cloud stacks by testing one layer (e.g., a group of components) at a time and/or one configuration at a time. In this example, the test plan or calibration plan may also include testing various combinations of layers or interactions, e.g., adding one layer to another layer or a latest layer to a group of layers already tested.

In some embodiments, a test plan or calibration plan may include performing one or more tests that focus on software interactions and/or software configurations. For example, a test plan or calibration plan may include testing a set of customer applications or VMs. In another example, a test plan or calibration plan may involve testing one or more applications and/or VMs (e.g., randomly selected) from an available (e.g., open-source or proprietary) software repository.

In step 403, RS 100, using system calibrator 140 and/or another component, may generate and send a test report to ABISS 204. For example, RS 100 may send to ABISS 204 one or more messages containing measurements or statistics obtained or derived during a server calibration.

In step 404, ABISS 204 may analyze the test report and/or related data and generate one or more correlation profiles. For example, ABISS 204 may receive, for each of a plurality of tests, MM related data from probes and/or sensors associated with various hardware and/or software in RS 100. In this example, ABISS 204 may determine baseline behaviors for components in RS 100.

In some embodiments, ABISS 204 may generate correlation profiles, baseline behavior data, statistical characteristics, or other output of the calibration process useable for identifying abnormal or unusual behaviors for a given workload and/or configuration. For example, output of the calibration process may include a set of statistical characteristics indicating how RS 100 or a similar server may perform or act under different conditions and/or configuration. In some embodiments, statistical characteristics may be correlated to identify baseline or "normal" behavior. For example, "normal" behavior data may include a set of measurements or other values for identifying outliers (e.g., unusual values) while executing production software (e.g., workload(s) 110) on RS 100 and/or in cloud-based environment 200.

In step 405, ABISS 204 may generate and send a calibration report to controller 202. For example, ABISS 204 may send to controller 202 one or more correlation profiles and/or related data associated with RS 100 for indicating effects of various workloads and/or server configurations on hardware and/or software measurements of RS 100.

It will be appreciated that FIG. 4 is for illustrative purposes and that different and/or additional messages and/or actions may be used for providing cloud visibility, system calibration, obtaining or monitoring hardware and/or software measurements, and/or related actions. It will also be appreciated that various messages and/or actions described herein with regard to FIG. 4 may occur in a different order or sequence.

Figure 5:
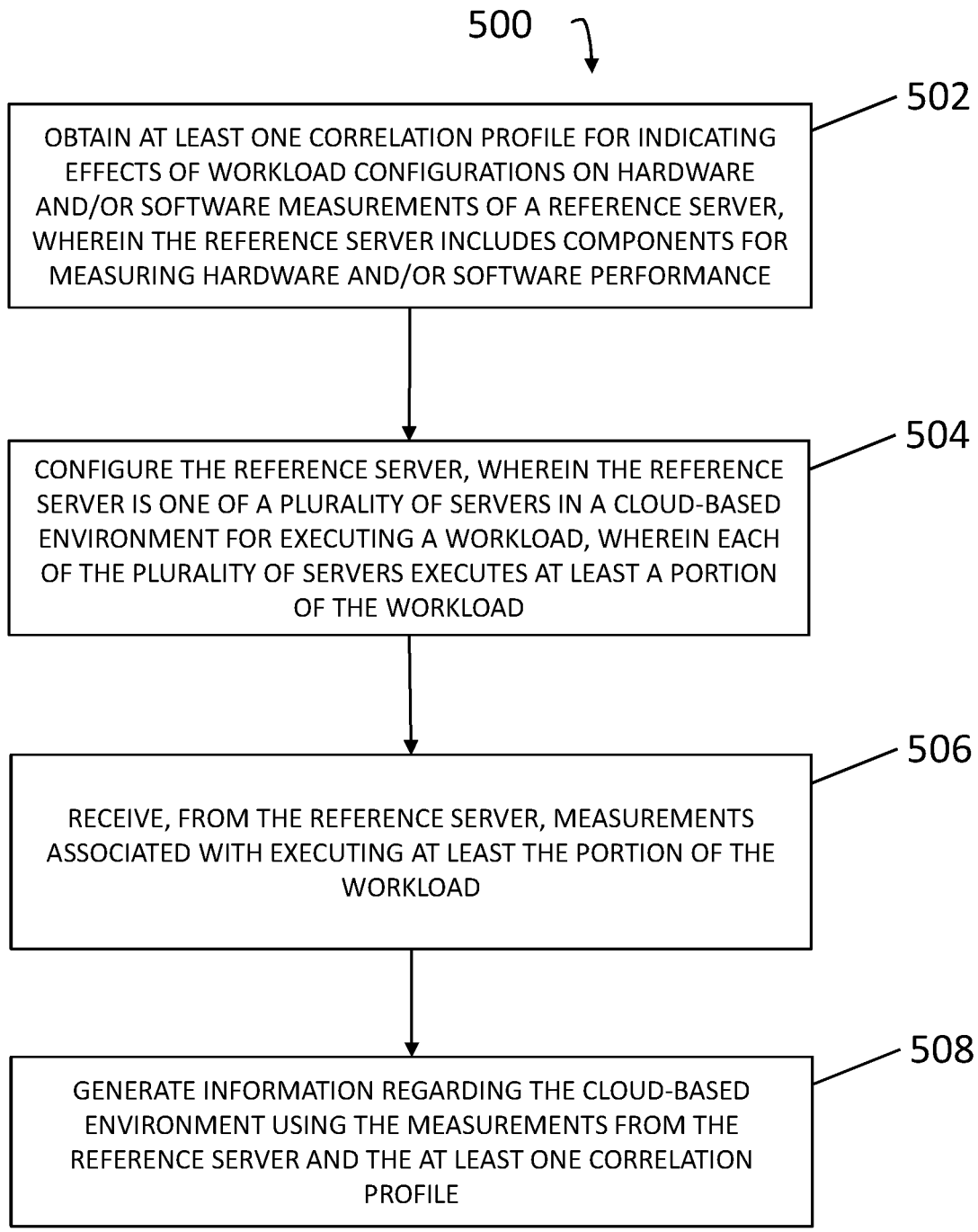
FIG. 5 is a diagram illustrating an example process for providing cloud visibility.

FIG. 5 is a diagram illustrating an example process 500 for providing cloud visibility. In some embodiments, process 500, or portions thereof, may be performed by RS 100, system calibrator 140, controller 202, ABISS 204, and/or another node, component, or module. In some embodiments, example process 500 may include steps 502, 504, 506, and/or 508.

Referring to example process 500, in step 502, at least one correlation profile for indicating effects of workload configurations on hardware and/or software measurements of a reference server may be obtained. For example, a correlation profile may indicate a set of values (e.g., measurements and/or statistics) representing baseline behavior for a specific hardware and/or software configuration of RS 100, wherein RS 100 includes measurement components 112 for measuring hardware and/or software performance (e.g., characteristics) in RS 100.

In some embodiments, components for measuring hardware and/or software may include a software based sensor, a hardware based sensor, a probe, an SMU, a memory monitor, a storage monitor, a processor monitor, a communication interface or bus monitor, a PMUs monitor, a memory module containing at least one sensor, an OS for obtaining measurements, a physical processor for obtaining measurements, an FPGA for obtaining measurements, or a network card for obtaining measurements.

In some embodiments, obtaining at least one correlation profile includes testing a reference server using different workload configurations; analyzing measurements from the reference server associated with the testing, and generating the at least one correlation profile based on the analysis.

In some embodiments, testing a reference server may include testing the reference server or related hardware using a BIOS or firmware, testing the reference server using a cloud-focused operating system with multiple configurations, testing the reference server using multiple cloud stack configurations involving various stack components, and testing the reference server using multiple customer software configurations.

In some embodiments, obtaining at least one correlation profile may include identifying a predetermined correlation profile from a plurality of predetermined correlation profiles based on characteristics of a reference server and a workload to be implemented.

In some embodiments, characteristics of a reference server and a workload to be implemented may include the location of the reference server, a speed of a component, a performance metric of the component, an amount of a network bandwidth, a workload performance metric, a number of compute resources available in a cloud-based environment, a number of storage resources available in the cloud-based environment, a number of compute resources available in the cloud-based environment, an amount of input and/or output operations expected for a workload, an amount of processing operations expected for the workload, an amount of storage operations expected for the workload, or an amount of required network bandwidth expected for the workload.

In step 504, the reference server may be configured, wherein the reference server is one of a plurality of servers in a cloud-based environment for executing a workload, wherein each of the plurality of servers executes at least a portion of the workload.

In some embodiments, the plurality of servers may include at least a second reference server.

In step 506, measurements associated with executing at least the portion of the workload may be received from the reference server.

In step 508, information regarding the cloud-based environment may be generated using the measurements from the reference server and the at least one correlation profile.

In some embodiments, generating information regarding a cloud-based environment may include identifying the execution of potentially malicious code based on detected measurements and the at least one correlation profile, identifying potential security issues based on detected measurements and the at least one correlation profile indicating memory leaks, and identifying power consumption of components within the reference server during execution of the workload based on detected measurements and the at least one correlation profile.

In some embodiments, information regarding the cloud-based environment may be provided to an analytics service or related node (e.g., ABISS 204) or data storage 206.

It will be appreciated that process 500 is for illustrative purposes and that different and/or additional actions may be used. It will also be appreciated that various actions described herein may occur in a different order or sequence.

It should be noted that RS 100, system calibrator 140, controller 202, ABISS 204, and/or functionality described herein may constitute a special purpose computing device. For example, controller 202 or ABISS 204 may be a CloudLens™ cloud visibility appliance manufactured by Ixia and configured to perform various aspects described herein. Further, RS 100, system calibrator 140, controller 202, ABISS 204, and/or functionality described herein can improve the technological field of network visibility, including security and testing, by providing a tenable solution for providing cloud visibility using hardware and/or software measurements from one or more RSs 100, where the one or more RSs 100 are included in a plurality of servers (e.g., server clusters) configured to execute a workload. For example, by using measurements from one or more RSs 100, controller 202 or ABISS 204 can determine or derive, e.g., based on extrapolation techniques or related algorithms, hardware and/or software effects (e.g., power consumption) of the workload or a portion of the workload on the entirety of the servers (e.g., cloud), a server cluster, and/or an individual (e.g., non-reference) servers thereof. Further, RS 100, system calibrator 140, controller 202, ABISS 204, and/or functionality described herein can improve the technological fields of computer security and network security by calibrating a reference server to obtain a correlation profile and/or baseline behavior data (e.g., measurements) for various workloads and/or specific system configuration and using this knowledge to identify unusual and potentially malicious behaviors. For example, controller 202 or ABISS 204 can monitor measurements during a workload and, if a significant discrepancy between the monitored behavior and a corresponding predetermined baseline behavior is detected, controller 202 or ABISS 204 may perform a mitigation action and/or notify a network operator regarding a potential security threat, e.g., malicious code execution, memory leaks, etc.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing cloud visibility, the method comprising:
    obtaining at least one correlation profile for indicating effects of workload configurations on hardware and/or software measurements of a reference server, wherein the reference server includes components for measuring hardware and/or software performance, wherein the components include a source measure unit and a dedicated measurement framework circuit board including a physical processor and/or a field-programmable gate array (FPGA) usable for offloading at least some processing associated with measuring hardware and/or software performance;
    configuring the reference server, wherein the reference server is one of a plurality of servers in a cloud-based environment for executing a workload, wherein each of the plurality of servers executes at least a portion of the workload;
    receiving, from the reference server, measurements associated with executing at least the portion of the workload; and
    generating information regarding the cloud-based environment using the measurements from the reference server and the at least one correlation profile.

2. The method of claim 1 wherein obtaining the at least one correlation profile includes:
    testing the reference server using different workload configurations;
    analyzing measurements from the reference server associated with the testing; and
    generating the at least one correlation profile based on the analysis.

3. The method of claim 2 wherein testing the reference server includes:
    testing the reference server or related hardware using a basic input/output system (BIOS) or firmware;
    testing the reference server using a cloud-focused operating system with multiple configurations;
    testing the reference server using multiple cloud stack configurations involving various stack components; and
    testing the reference server using multiple customer software configurations.

4. The method of claim 1 wherein obtaining the at least one correlation profile includes identifying a predetermined correlation profile from a plurality of predetermined correlation profiles based on characteristics of the reference server and the workload to be implemented.

5. The method of claim 4 wherein the characteristics of the reference server and the workload to be implemented include the location of the reference server, a speed of a component, a performance metric of a component, an amount of a network bandwidth, a workload performance metric, a number of compute resources available in the cloud-based environment, a number of storage resources available in the cloud-based environment, a number of compute resources available in the cloud-based environment, an amount of input and/or output operations expected for the workload, an amount of processing operations expected for the workload, an amount of storage operations expected for the workload, or an amount of required network bandwidth expected for the workload.

6. The method of claim 1 where generating the information regarding the cloud-based environment includes identifying the execution of potentially malicious code based on detected measurements and the at least one correlation profile, identifying potential security issues based on detected measurements and the at least one correlation profile indicating memory leaks, and identifying power consumption of components within the reference server during execution of the workload based on detected measurements and the at least one correlation profile.

7. The method of claim 1 wherein the plurality of servers includes at least a second reference server.

8. The method of claim 1 wherein the components include a software based sensor, a hardware based sensor, a probe, a memory monitor, a storage monitor, a processor monitor, a communication interface or bus monitor, a processor measurement units (PMUs) monitor, a memory module containing at least one sensor, an operating system for obtaining measurements, or a network card for obtaining measurements.

9. A system for providing cloud visibility, the system comprising:
    at least one processor; and
    a controller implemented using the at least one processor, wherein the controller is configured for:
        obtaining at least one correlation profile for indicating effects of workload configurations on hardware and/or software measurements of a reference server, wherein the reference server includes components for measuring hardware and/or software performance, wherein the components include a source measure unit and a dedicated measurement framework circuit board including a physical processor and/or a field-programmable gate array (FPGA) usable for offloading at least some processing associated with measuring hardware and/or software performance;
        configuring the reference server, wherein the reference server is one of a plurality of servers in a cloud-based environment for executing a workload, wherein each of the plurality of servers executes at least a portion of the workload;
        receiving, from the reference server, measurements associated with executing at least the portion of the workload; and
        generating information regarding the cloud-based environment using the measurements from the reference server and the at least one correlation profile.

10. The system of claim 9 wherein obtaining the at least one correlation profile includes:

testing the reference server using different workload configurations;
analyzing measurements from the reference server associated with the testing; and
generating the at least one correlation profile based on the analysis.

11. The system of claim 10 wherein testing the reference server includes:
testing the reference server or related hardware using a basic input/output system (BIOS) or firmware;
testing the reference server using a cloud-focused operating system with multiple configurations;
testing the reference server using multiple cloud stack configurations involving various stack components; and
testing the reference server using multiple customer software configurations.

12. The system of claim 9 wherein obtaining the at least one correlation profile includes identifying a predetermined correlation profile from a plurality of predetermined correlation profiles based on characteristics of the reference server and the workload to be implemented.

13. The system of claim 12 wherein the characteristics of the reference server and the workload to be implemented include the location of the reference server, a speed of a component, a performance metric of a component, an amount of a network bandwidth, a workload performance metric, a number of compute resources available in the cloud-based environment, a number of storage resources available in the cloud-based environment, a number of compute resources available in the cloud-based environment, an amount of input and/or output operations expected for the workload, an amount of processing operations expected for the workload, an amount of storage operations expected for the workload, or an amount of required network bandwidth expected for the workload.

14. The system of claim 9 where generating the information regarding the cloud-based environment includes identifying the execution of potentially malicious code based on detected measurements and the at least one correlation profile, identifying potential security issues based on detected measurements and the at least one correlation profile indicating memory leaks, and identifying power consumption of components within the reference server during execution of the workload based on detected measurements and the at least one correlation profile.

15. The system of claim 9 wherein the plurality of servers includes at least a second reference server.

16. The system of claim 9 wherein the components include a software based sensor, a hardware based sensor, a probe, a memory monitor, a storage monitor, a processor monitor, a communication interface or bus monitor, a processor measurement units (PMUs) monitor, a random access memory (RAM) module containing at least one sensor, an operating system for obtaining measurements, or a network card for obtaining measurements.

17. A non-transitory computer readable medium comprising computer executable instructions that when executed by at least one processor of a computer cause the computer to perform steps comprising:
obtaining at least one correlation profile for indicating effects of workload configurations on hardware and/or software measurements of a reference server, wherein the reference server includes components for measuring hardware and/or software performance, wherein the components include a source measure unit and a dedicated measurement framework circuit board including a physical processor and/or a field-programmable gate array (FPGA) usable for offloading at least some processing associated with measuring hardware and/or software performance;
configuring the reference server, wherein the reference server is one of a plurality of servers in a cloud-based environment for executing a workload, wherein each of the plurality of servers executes at least a portion of the workload;
receiving, from the reference server, measurements associated with executing at least the portion of the workload; and
generating information regarding the cloud-based environment using the measurements from the reference server and the at least one correlation profile.

18. The non-transitory computer readable medium of claim 17 wherein obtaining the at least one correlation profile includes:
testing the reference server using different workload configurations;
analyzing measurements from the reference server associated with the testing; and
generating the at least one correlation profile based on the analysis.

19. The non-transitory computer readable medium of claim 18 wherein testing the reference server includes:
testing the reference server or related hardware using a basic input/output system (BIOS) or firmware;
testing the reference server using a cloud-focused operating system with multiple configurations;
testing the reference server using multiple cloud stack configurations involving various stack components; and
testing the reference server using multiple customer software configurations.

20. The non-transitory computer readable medium of claim 17 wherein obtaining the at least one correlation profile includes identifying a predetermined correlation profile from a plurality of predetermined correlation profiles based on characteristics of the reference server and the workload to be implemented.

* * * * *